United States Patent
Strohkendl et al.

(10) Patent No.: US 10,511,135 B2
(45) Date of Patent: Dec. 17, 2019

(54) LASER SYSTEM WITH MECHANICALLY-ROBUST MONOLITHIC FUSED PLANAR WAVEGUIDE (PWG) STRUCTURE

(71) Applicant: Raytheon Company, Waltham, MA (US)

(72) Inventors: Friedrich P. Strohkendl, Santa Monica, CA (US); Michael Ushinsky, Irvine, CA (US); Jeffrey P. Yanevich, Bradenton, FL (US)

(73) Assignee: Raytheon Company, Waltham, MA (US)

( * ) Notice: Subject to any disclaimer, the term of this patent is extended or adjusted under 35 U.S.C. 154(b) by 31 days.

(21) Appl. No.: 15/846,434

(22) Filed: Dec. 19, 2017

(65) Prior Publication Data
US 2019/0190230 A1   Jun. 20, 2019

(51) Int. Cl.
*H01S 3/04* (2006.01)
*H01S 3/23* (2006.01)
(Continued)

(52) U.S. Cl.
CPC .......... *H01S 3/2308* (2013.01); *H01S 3/0407* (2013.01); *H01S 3/0612* (2013.01);
(Continued)

(58) Field of Classification Search
None
See application file for complete search history.

(56) References Cited

U.S. PATENT DOCUMENTS

| 3,660,673 A | * | 5/1972 | Anderson | G02F 1/395 |
| | | | | 257/E45.006 |
| 5,105,430 A | | 4/1992 | Mundinger et al. | |

(Continued)

FOREIGN PATENT DOCUMENTS

| EP | 1003252 A2 | 5/2000 |
| EP | 1357647 A2 | 10/2003 |

(Continued)

OTHER PUBLICATIONS

Beach et al, "Continuous-Wave and Passively Q-Switched Cladding-Pumped Planar Waveguide Lasers," Optics Letters, vol. 26, No. 12, Jun. 2001, 4 pages.

(Continued)

*Primary Examiner* — Chad H Smith

(57) ABSTRACT

An apparatus includes a PWG having a core region and a cladding layer. The amplifier is configured to receive pump light. The core region is configured to amplify an input beam using energy from the pump light to generate an amplified output beam. The apparatus also includes a cooling fluid configured to cool the core region. The cooling fluid has a lower refractive index than the core region and the cladding layer in order to support guiding of the input beam and pump light within the amplifier. The amplifier also includes first and second endcaps attached to opposite faces of the core region and cladding layer. The core region, cladding layer, and endcaps collectively form a monolithic fused structure. Each endcap has a major outer surface that is larger in area than a combined area of the faces of the core region and cladding layer to which the endcap is attached.

23 Claims, 7 Drawing Sheets

(51) Int. Cl.
*H01S 3/10* (2006.01)
*H01S 3/17* (2006.01)
*H01S 3/063* (2006.01)
*H01S 3/06* (2006.01)
*H01S 3/091* (2006.01)
*H01S 3/094* (2006.01)
*H01S 3/0941* (2006.01)
*H01S 3/02* (2006.01)
*H01S 3/042* (2006.01)

(52) U.S. Cl.
CPC ........ *H01S 3/0632* (2013.01); *H01S 3/10015* (2013.01); *H01S 3/176* (2013.01); *H01S 3/025* (2013.01); *H01S 3/042* (2013.01); *H01S 3/091* (2013.01); *H01S 3/09415* (2013.01); *H01S 3/094057* (2013.01)

(56) References Cited

U.S. PATENT DOCUMENTS

| | | |
|---|---|---|
| 5,233,624 A | 8/1993 | LaPlante et al. |
| 5,327,444 A | 7/1994 | Mooradian |
| 5,363,391 A | 11/1994 | Matthews et al. |
| 5,377,212 A | 12/1994 | Tatsuno et al. |
| 5,398,130 A | 3/1995 | Redman |
| 5,778,132 A | 7/1998 | Csipkes et al. |
| 5,852,622 A | 12/1998 | Meissner et al. |
| 5,863,017 A | 1/1999 | Larson et al. |
| 6,026,109 A | 2/2000 | Micke et al. |
| 6,039,632 A | 3/2000 | Robertson |
| 6,072,814 A | 6/2000 | Ryan et al. |
| 6,160,824 A | 12/2000 | Meissner et al. |
| 6,289,031 B1 | 9/2001 | Stultz et al. |
| 6,417,955 B1 | 7/2002 | Kafka et al. |
| 6,529,318 B1 | 3/2003 | Kaneda et al. |
| 6,690,696 B2 | 2/2004 | Byren et al. |
| 6,738,396 B2 | 5/2004 | Filgas et al. |
| 6,809,307 B2 | 10/2004 | Byren et al. |
| 6,810,060 B2 | 10/2004 | Vetrovec |
| 6,859,472 B2 | 2/2005 | Betin et al. |
| 6,937,629 B2 | 8/2005 | Perry et al. |
| 7,065,121 B2 | 6/2006 | Filgas et al. |
| 7,472,741 B2 | 1/2009 | Johnson et al. |
| 7,876,802 B2 | 1/2011 | McDonagh |
| 7,983,312 B2 | 7/2011 | Shkunov et al. |
| 8,021,900 B2 | 9/2011 | Maxwell et al. |
| 8,040,521 B2 | 10/2011 | Pfaff |
| 8,078,262 B2 | 12/2011 | Murphy et al. |
| 8,274,738 B2 | 9/2012 | Hasman et al. |
| 8,405,823 B2 | 3/2013 | Pfaff |
| 8,488,245 B1 | 7/2013 | Chann et al. |
| 8,565,272 B2 | 10/2013 | Shkunov et al. |
| 8,657,477 B2 | 2/2014 | Shiraishi et al. |
| 8,690,407 B2 | 4/2014 | Shiraishi et al. |
| 8,728,720 B2 | 5/2014 | Hwang et al. |
| 8,731,013 B2 | 5/2014 | Byren et al. |
| 8,736,775 B2 | 5/2014 | Utsunomiya |
| 8,736,823 B2 | 5/2014 | Pfaff |
| 8,787,768 B2 | 7/2014 | Klotz et al. |
| 8,807,819 B2 | 8/2014 | Shiraishi et al. |
| 8,886,294 B2 | 11/2014 | Lisogurski et al. |
| 8,977,097 B2 | 3/2015 | Filgas |
| 8,994,037 B2 | 3/2015 | Maxwell et al. |
| 9,014,226 B2 | 4/2015 | Penn |
| 9,146,357 B2 | 9/2015 | Wada et al. |
| 9,158,043 B2 | 10/2015 | Hasman et al. |
| 9,366,719 B2 | 6/2016 | Pfaff |
| 9,448,190 B2 | 9/2016 | Yun et al. |
| 9,507,088 B2 | 11/2016 | Filgas |
| 9,574,749 B2 | 2/2017 | Trail et al. |
| 9,594,036 B2 | 3/2017 | Yun et al. |
| 9,623,414 B2 | 4/2017 | Ceremony et al. |
| 9,726,820 B2 | 8/2017 | Filgas et al. |
| 9,742,144 B1 | 8/2017 | Kang |
| 9,762,018 B2 | 9/2017 | Filgas et al. |
| 9,821,314 B2 | 11/2017 | Erickson et al. |
| 9,823,203 B2 | 11/2017 | Yun et al. |
| 9,839,162 B2 | 12/2017 | Crawford |
| 9,865,988 B2 | 1/2018 | Filgas et al. |
| 2002/0110166 A1 | 8/2002 | Filgas |
| 2002/0118718 A1 | 8/2002 | Honea et al. |
| 2002/0131746 A1 | 9/2002 | Bayramian et al. |
| 2003/0010823 A1 | 1/2003 | Tsikos et al. |
| 2003/0138021 A1 | 7/2003 | Hodgson et al. |
| 2003/0161375 A1* | 8/2003 | Filgas ................ B23K 26/0648 372/66 |
| 2003/0231667 A1 | 12/2003 | Byren et al. |
| 2004/0028094 A1 | 2/2004 | Betin et al. |
| 2004/0032896 A1 | 2/2004 | Patel et al. |
| 2004/0052280 A1 | 3/2004 | Rice |
| 2004/0240500 A1 | 12/2004 | Mercer |
| 2004/0258123 A1 | 12/2004 | Zamel et al. |
| 2006/0108098 A1 | 5/2006 | Stevanovic et al. |
| 2006/0175041 A1 | 8/2006 | Johnson et al. |
| 2006/0227841 A1 | 10/2006 | Savich |
| 2006/0263024 A1 | 11/2006 | Dong et al. |
| 2007/0238219 A1 | 10/2007 | Bennett et al. |
| 2008/0037601 A1 | 2/2008 | Nielsen |
| 2008/0069160 A1 | 3/2008 | Stephens |
| 2008/0095204 A1 | 4/2008 | Miyajima et al. |
| 2008/0198882 A1 | 8/2008 | Clar et al. |
| 2008/0239317 A1 | 10/2008 | Schulkin et al. |
| 2009/0290167 A1 | 11/2009 | Flanders et al. |
| 2010/0189137 A1* | 7/2010 | Shkunov ................ H01S 3/04 372/6 |
| 2010/0195676 A1 | 8/2010 | Shakir et al. |
| 2011/0075687 A1 | 3/2011 | Gokay |
| 2012/0051688 A1 | 3/2012 | Pitwon |
| 2012/0076159 A1* | 3/2012 | Shkunov ............. H01S 3/06704 372/6 |
| 2012/0103569 A1 | 5/2012 | Kim |
| 2013/0142481 A1 | 6/2013 | Rockwell et al. |
| 2013/0223470 A1 | 8/2013 | Kim et al. |
| 2013/0314770 A1 | 11/2013 | Sfez |
| 2014/0160786 A1 | 6/2014 | Hargis et al. |
| 2014/0212094 A1 | 7/2014 | Wada et al. |
| 2014/0268309 A1 | 9/2014 | Strohkendl |
| 2015/0194784 A1 | 7/2015 | Kwon et al. |
| 2015/0216718 A1 | 8/2015 | Diller et al. |
| 2015/0378093 A1 | 12/2015 | Murgai |
| 2016/0028210 A1 | 1/2016 | OShaughnessy et al. |
| 2016/0047981 A1 | 2/2016 | Filgas et al. |
| 2016/0047982 A1* | 2/2016 | Filgas ................. G02B 6/1228 385/30 |
| 2016/0276430 A1 | 9/2016 | Okumura et al. |
| 2017/0237220 A1 | 8/2017 | McGanty et al. |
| 2017/0353005 A1 | 12/2017 | Filgas et al. |
| 2018/0013256 A1 | 1/2018 | Filgas et al. |

FOREIGN PATENT DOCUMENTS

| | | |
|---|---|---|
| EP | 1492207 A2 | 12/2004 |
| JP | 2011-176257 A | 9/2011 |
| WO | WO0027000 A1 | 5/2000 |
| WO | WO0161799 A2 | 8/2001 |
| WO | 2011/027731 A1 | 3/2011 |

OTHER PUBLICATIONS

McManamon et al., "Review of Phased Array Steering for Narrow-Band Electrooptical Systems", Proceedings of the IEEE, vol. 97, No. 6, Jun. 2009, pp. 1078-1096.

Novak et al., "Status of the High Average Power Diode-Pumped Solid State Laser Development at HiLASE," Appl. Sci. 2015, pp. 637-665.

Pearson et al., "Applied Optics and Optical Engineering," vol. VII, Chapter 8, "Adaptive Techniques for Wave-Front Correction", 1979, pp. 259-264.

Ravichandran, "Spatial and Temporal Modulation of Heat Source Using Light Modulator for Advanced Thermography," Master The-

(56) References Cited

OTHER PUBLICATIONS ses, Missouri University of Science and Technology, Spring 2015, 72 pages.

Toro, "Thermal effects in microfluidics with thermal conductivity spatially modulated," Proceedings of SPIE 9107, Smart Biomedical and Physiological Sensor Technology XI, 9107M, May 2014, 12 pages.

Website https://merriam-webster.com/dictionary/seal, retrieved on Mar. 2, 2017, 15 pages.

Filgas et al., "Recent Results for the Raytheon RELI Program", Laser Technology for Defense and Security VIII, SPIE, vol. 8381, No. 1, May 2012, 8 pages.

International Search Report and Written Opinion of the International Searching Authority dated Feb. 5, 2016 in connection with International Application No. PCT/US2015/055014, 8 pages.

International Search Report and Written Opinion of the International Searching Authority dated Nov. 16, 2017 in connection with International Application No. PCT/US2016/065988, 21 pages.

International Search Report and Written Opinion of the International Searching Authority dated Dec. 15, 2016 in connection with International Application No. PCT/US2016/049146, 15 pages.

International Search Report and Written Opinion of the International Searching Authority dated Dec. 15, 2016 in connection with International Application No. PCT/US2016/049149, 12 pages.

International Search Report and Written Opinion of the International Searching Authority dated Dec. 15, 2016 in connection with International Application No. PCT/US2016/049151, 12 pages.

International Search Report and Written Opinion of the International Searching Authority dated Dec. 15, 2016 in connection with International Application No. PCT/US2016/049152, 15 pages.

Invitation to Pay Additional Fees and Communication Relating to the Results of the Partial International Search dated Aug. 1, 2017 in connection with International Patent Application No. PCT/US2016/065988, 14 pages.

Filgas et al., "Dual-Function Optical Bench and Cooling Manifold for High-Power Laser System", U.S. Appl. No. 15/233,928, filed Aug. 10, 2016, 80 pages.

Filgas et al., "Integrated Pumplight Homogenizer and Signal Injector for High-Power Laser System", U.S. Appl. No. 15/233,303, filed Aug. 10, 2016, 81 pages.

Office Action dated Feb. 8, 2017 in connection with U.S. Appl. No. 15/233,238, 16 pages.

Office Action dated Mar. 10, 2017 in connection with U.S. Appl. No. 15/041,909, 17 pages.

International Search Report and Written Opinion of the International Searching Authority dated Nov. 30, 2018 in connection with International Patent Application No. PCT/US2018/044074, 16 pages.

\* cited by examiner

LASER SYSTEM WITH MECHANICALLY-ROBUST MONOLITHIC FUSED PLANAR WAVEGUIDE (PWG) STRUCTURE

TECHNICAL FIELD

This disclosure is generally directed to high-power laser systems. More specifically, this disclosure is directed to a laser system with a mechanically-robust monolithic fused planar waveguide (PWG) structure.

BACKGROUND

High-power laser systems are being developed for a number of military and commercial applications. Some high-power laser systems use planar waveguide (PWG) amplifiers to amplify lower-power input signals and generate higher-power output signals. A conventional PWG amplifier includes a core region that receives a lower-power input signal and generates a higher-power output signal, and the core region is typically surrounded by cladding layers having a different refractive index than the core region. Pump energy received by the PWG amplifier provides the energy needed by the core region for optical amplification of the input signal.

Unfortunately, conventional PWG amplifiers can have very complex opto-mechanical and thermo-optic designs. For example, some conventional yttrium aluminum garnet (YAG) PWG amplifiers require complex coating configurations with various coating types on different surfaces of the amplifiers, complex multilayer cooling interfaces, and complex management of spilled pump light. Moreover, conventional YAG PWG amplifiers are often mechanically fragile devices that can be damaged relatively easily.

For these and other reasons, it can be costly, time consuming, and difficult to manufacture conventional PWG amplifiers. Also, defects can often arise in the manufacturing process. For instance, heat sinks are often pressed onto various surfaces of PWG amplifiers at high pressures, which can cause deformation of the heat sinks, the core region, or the cladding layers. Moreover, it can be difficult to avoid creating defects at the edges of the core region or the cladding layer. Further, the coupling of thermal energy into solid heat sinks can be inefficient, which results in inefficient cooling of the core region. In addition, it can be difficult or impossible to design a conventional PWG amplifier to compensate for thermal lensing or other non-uniform thermo-optic aberrations created in the core region during operation of the PWG amplifier.

SUMMARY

This disclosure provides a laser system with a mechanically-robust monolithic fused planar waveguide (PWG) structure.

In a first embodiment, an apparatus includes a PWG amplifier having a core region and a cladding layer. The PWG amplifier is configured to receive pump light, and the core region is configured to amplify an input beam using energy from the pump light to generate an amplified output beam. The apparatus also includes a cooling fluid configured to cool the core region. The cooling fluid has a lower refractive index than the core region and the cladding layer in order to support guiding of the input beam and the pump light within the PWG amplifier. The PWG amplifier also includes first and second endcaps attached to opposite faces of the core region and the cladding layer. The core region, the cladding layer, and the endcaps collectively form a monolithic fused structure. Each of the endcaps has a major outer surface that is larger in area than a combined area of the faces of the core region and the cladding layer to which the endcap is attached.

In a second embodiment, a system includes a master oscillator configured to generate an input beam, a pump source configured to generate pump light, and a PWG amplifier configured to amplify the input beam and generate an amplified output beam using the pump light. The PWG amplifier includes a core region and a cladding layer, where the core region is configured to amplify the input beam using energy from the pump light to generate the amplified output beam. The PWG amplifier also includes a cooling fluid configured to cool the core region. The cooling fluid has a lower refractive index than the core region and the cladding layer in order to support guiding of the input beam and the pump light within the PWG amplifier. The PWG amplifier further includes first and second endcaps attached to opposite faces of the core region and the cladding layer. The core region, the cladding layer, and the endcaps collectively form a monolithic fused structure. Each of the endcaps has a major outer surface that is larger in area than a combined area of the faces of the core region and the cladding layer to which the endcap is attached.

In a third embodiment, a method includes obtaining a PWG structure having a core region and a cladding layer. The PWG structure is configured to receive pump light, and the core region is configured to amplify an input beam using energy from the pump light to generate an amplified output beam. The method also includes attaching first and second endcaps to opposite faces of the core region and the cladding layer. The method further includes supplying a cooling fluid configured to cool the core region. The cooling fluid has a lower refractive index than the core region and the cladding layer in order to support guiding of the input beam and the pump light within the PWG amplifier. The core region, the cladding layer, and the endcaps collectively form a monolithic fused structure. Each of the endcaps has a major outer surface that is larger in area than a combined area of the faces of the core region and the cladding layer to which the endcap is attached.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
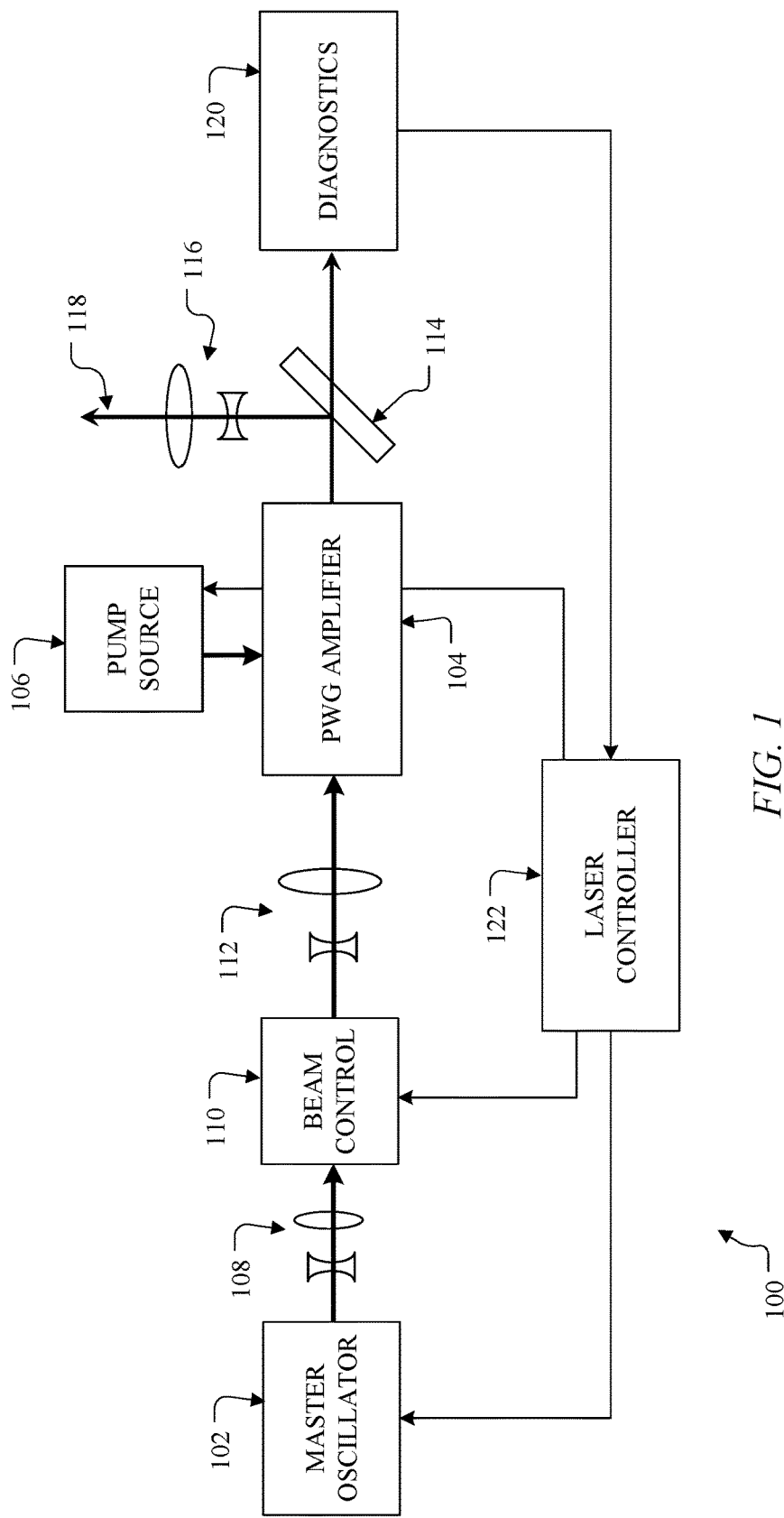
FIG. 1 illustrates an example high-power laser system according to this disclosure.

FIG. 1 illustrates an example high-power laser system 100 according to this disclosure. As shown in FIG. 1, the laser system 100 includes a master oscillator 102 and a planar waveguide (PWG) amplifier 104. The laser system 100 therefore has a master oscillator/power amplifier (MOPA) configuration.

The master oscillator 102 generally operates to generate low-power optical signals. The low-power optical signals could represent any suitable optical signals having relatively low power. For example, the low-power optical signals could include optical signals having a continuous wave (CW) output, a continuous pulse train (CPT), a pulse burst, or any of various other waveforms. The master oscillator 102 includes any suitable structure(s) for generating one or more low-power optical signals. In some embodiments, the master oscillator 102 includes a fiber laser.

The PWG amplifier 104 receives the low-power optical signals from the master oscillator 102. The PWG amplifier 104 also receives pump power for performing optical amplification from one or more pump sources 106. The PWG amplifier 104 generally operates to amplify the low-power optical signals and generate high-power optical signals using the pump power. For example, the PWG amplifier 104 could amplify a low-power CW or other optical signal into a high-power CW or other optical signal having ten kilowatts of power or more. The pump power received from the pump source 106 provides the necessary population inversion in the PWG amplifier's gain medium for this amplification. The pump source 106 includes any suitable source of pump energy for the PWG amplifier 104, such as one or more laser diodes.

The gain medium of the PWG amplifier 104 is formed using a planar waveguide. As discussed in more detail below, the planar waveguide represents a structure that includes a core region and a cladding layer. The core region provides the optical amplification of the low-power optical signals from the master oscillator 102. The core region can also be cooled using a cooling fluid. The indexes of refraction and dielectric constants of the core region, the cladding layer, and the cooling fluid differ to create boundaries that maintain guiding conditions for optical signals within the core region.

Relay optics 108 direct the optical signals from the master oscillator 102 into a beam controller 110, and relay optics 112 direct the optical signals from the beam controller 110 into the PWG amplifier 104. The relay optics 108 and 112 can also alter the cross-sectional dimensions of the optical signals as needed for injection into the beam controller 110 and the PWG amplifier 104, respectively. Each of the relay optics 108 and 112 includes any suitable optical device(s) for directing or formatting optical signals.

The beam controller 110 generally operates to modify the optical signals from the master oscillator 102 before the optical signals reach the PWG amplifier 104. For example, the beam controller 110 could pre-distort the phase profile of the optical signals from the master oscillator 102 in order to substantially or completely compensate for optical phase distortions created within the PWG amplifier 104. The beam controller 110 could also pre-distort both the amplitude and phase of the optical signals from the master oscillator 102. The beam controller 110 could further include separate control devices for two-axis tip/tilt alignment control and higher-order beam control. The beam controller 110 includes any suitable structure(s) for pre-distorting or otherwise modifying optical signals in a controllable manner.

A high-power output beam 118 generated by the PWG amplifier 104 is directed towards a beam splitter 114. The beam splitter 114 provides a substantial portion of the high-power output beam 118 to relay optics 116, which provide that portion of the high-power output beam 118 out of the laser system 100. The beam splitter 114 also provides a small amount of the high-power output beam 118 as samples to a feedback loop. The feedback loop is used to control and modify operation of the master oscillator 102, PWG amplifier 104, pump source 106, beam controller 110, or other components of the laser system 100. The beam splitter 114 includes any suitable structure(s) for splitting optical signals. The relay optics 116 include any suitable optical device(s) for directing or formatting optical signals.

The feedback loop here includes a diagnostics unit 120 and a laser controller 122. The diagnostics unit 120 generally operates to analyze the samples of the high-power output beam 118 from the PWG amplifier 104 and provide diagnostic data to the laser controller 122. The diagnostics unit 120 includes any suitable structure for identifying one or more characteristics of at least one sample of a high-power output beam. In some embodiments, diagnostic data from the diagnostics unit 120 could be output by the diagnostics unit 120 or the laser controller 122, such as to one or more external destinations. This could allow the external destinations to monitor the health, status, or safety of the laser system 100.

The laser controller 122 uses data from the diagnostics unit 120 to determine how to adjust operation of the laser system 100. The laser controller 122 could control the operation of components of the laser system 100 in any suitable manner. For example, the laser controller 122 could use measurements of the high-power output beam 118 from the PWG amplifier 104 captured by the diagnostics unit 120 in order to determine whether to increase or decrease the pump energy being provided by the pump source 106. As another example, the master oscillator 102 and the pump source 106 could include laser diodes, and the laser controller 122 could alter or adjust the operation of one or more diode drivers in order to alter the operation of the master oscillator 102 and the pump source 106. The laser controller 122 can also respond to mode control commands from one or more external sources, such as control commands for initiating cooling or for initiating or ceasing laser action.

The laser controller 122 could perform a wide variety of other or additional functions. For example, in some embodiments, the laser controller 122 may run background and commanded built-in-test (BIT) routines to monitor the health, status, or safety of the laser system 100, predict the need for unscheduled maintenance, perform start-up sequencing, and/or shut the laser system 100 down if parameters are out of safety tolerance. Shutdown commands may also be received from an external source. In the event of a shutdown command, the laser controller 122 commands the master oscillator 102 and pump source 106 to turn off, and components such as fast reflective shutters may be used to divert residual laser power into a cooled beam dump (not shown).

The laser controller 122 includes any suitable structure for controlling operation of a laser system. For example, the laser controller 122 could include one or more processing devices, such as one or more microprocessors, microcontrollers, digital signal processors, field programmable gate arrays, application specific integrated circuits, or discrete logic devices. The laser controller 122 could also include one or more memories configured to store instructions or data used, generated, or collected by the processing device (s). The laser controller 122 could further include one or more interfaces configured to facilitate communications with other components or systems.

As noted above, conventional planar waveguide (PWG) amplifiers, such as yttrium aluminum garnet (YAG) PWG amplifiers, can suffer from various problems or shortcomings. These problems or shortcomings include fragility, complex manufacturing requirements, inefficiency in heat removal, the tendency to suffer from defects, and the inability to compensate for thermal lensing or other non-uniform thermo-optic aberrations.

In accordance with this disclosure and as described in more detail below, the PWG amplifier 104 includes a PWG structure that could be formed primarily from glass. The PWG structure is more mechanically robust than conventional PWG amplifiers, which can be achieved partially through the use of a structural backbone that supports the core region and cladding layer of the PWG amplifier 104. Also, the PWG structure can be formed as a monolithic fused structure, such as through the use of glass bonding techniques. Further, the PWG structure can be sealable for direct liquid cooling or immersion in cooling fluids. For instance, the structural strength of the PWG amplifier 104 makes it possible to mount it into a coolant bath, where liquid seals are much easier to implement using the endcaps 206 and 208 and the structure does not flap around in high-pressure flowing coolant. Moreover, the PWG structure can have a reduced number of parts compared to conventional PWG amplifiers, and the PWG structure can provide a simplified thermo-optic interface and can avoid the use of combustible materials (such as graphite, which is often used as a thermo-optic interface material). Beyond that, the PWG structure can reduce or minimize coating defects on end facets and reduce or eliminate edge effects, and the PWG structure provides for easier stray light management since the PWG structure can be entirely optically transparent. In addition, the PWG structure can provide for more uniform heat dissipation to minimize stresses (particularly at the pump input facet and its endcap core transition), and the PWG structure can support spatially-structured heat transfer impedances for detailed compensation of large-scale index distortions (such as thermal lensing and other irregular thermo-optic distortions). Additional details regarding example implementations of the PWG amplifier 104 using fused glass are provided below.

Although FIG. 1 illustrates one example of a high-power laser system 100, various changes may be made to FIG. 1. For example, any number of each component could be used in the laser system 100. As a particular example, a series of PWG amplifiers 104 could be used, rather than a single PWG amplifier 104. Also, while FIG. 1 illustrates one example use of a PWG amplifier 104, a PWG amplifier 104 could be used in any other suitable manner.

Figure 2:
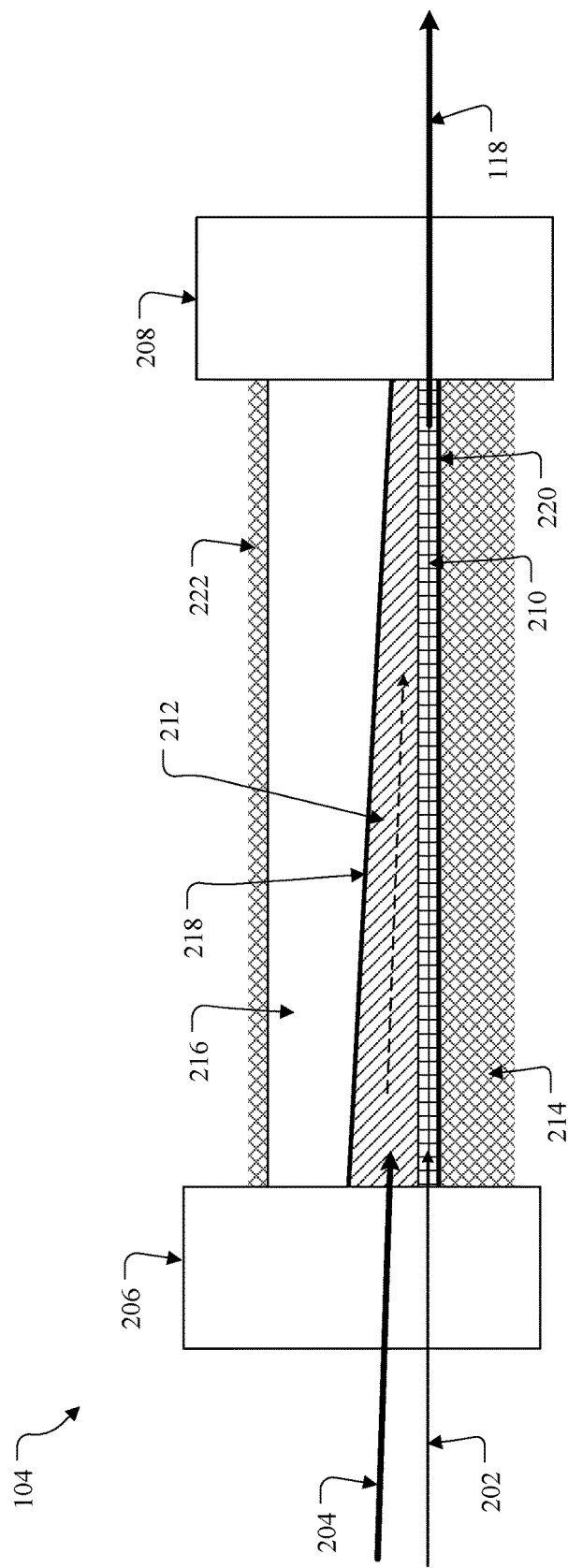
FIG. 2 illustrates an example mechanically-robust monolithic fused planar waveguide (PWG) amplifier according to this disclosure.

FIG. 2 illustrates an example mechanically-robust monolithic fused PWG amplifier 104 according to this disclosure. For ease of explanation, the PWG amplifier 104 of FIG. 2 is described as being used in the laser system 100 of FIG. 1. However, the PWG amplifier 104 of FIG. 2 could be used in any other suitable system.

As shown in FIG. 2, the PWG amplifier 104 receives a signal beam 202 and pump light 204. The signal beam 202 can be received from the master oscillator 102 and represents the optical signals being amplified by the PWG amplifier 104. The pump light 204 can be received from the pump source 106 and provides the energy used to perform optical amplification. The PWG amplifier 104 amplifies the signal beam 202 using the energy in the pump light 204 to produce the high-power output beam 118.

The PWG amplifier 104 in FIG. 2 includes endcaps 206 and 208. The endcaps 206 and 208 are passive endcaps provided at both ends of a core region 210 and a cladding layer 212. Each of the endcaps 206 and 208 can be formed from glass, such as fused silica or borosilicate glass (like BK7 glass from SCHOTT AG). The endcaps 206 and 208 may or may not be doped with at least one dopant to change their index of refraction. Any doping of the endcaps 206 and 208 produces little or no absorption at the signal and pump wavelengths, so no lasing occurs within the endcaps 206 and 208. In the example shown in FIG. 2, the endcaps 206 and 208 have a rectangular cross-section, although any other suitable cross-sectional shape could be used. For instance, round or disk-shaped endcaps could be used, where the endcaps function like sealed viewports into a coolant liquid-containing vessel.

The use of large endcaps 206 and 208 (relative to the sizes of the sides of the core region 210 and cladding layer 212) can help to simplify end-facet coating and avoid facet edge defects. The endcaps 206 and 208 are generally referred to as "oversized" endcaps since the unattached major outer surface of each endcap 206 and 208 is larger in surface area than the combined area of the faces of the core region 210 and cladding layer 212 to which the inner surface of the endcap 206 and 208 is attached. For instance, the unattached major outer surface of each endcap 206 and 208 could be at least twice as large in surface area compared to the combined area of the faces of the core region 210 and cladding layer 212 to which the inner surface of the endcap is attached. One or more of the endcaps 206 and 208 can therefore "overhang" the core region 210 and the cladding layer 212 since the endcap(s) can extend above and below the core region 210 and the cladding layer 212.

The use of large endcaps 206 and 208 can also help with the coupling of optical beams into and out of the PWG amplifier 104. For instance, an amplified beam (such as the beam 118) exiting the core region 210 into the volume of the endcap 208 can expand freely without colliding with the walls of the endcap 208. This is typically not the case with conventional endcap designs, which are often flush with the main PWG body. Moreover, conventional designs with flush endcaps often need passive core waveguides inside the input endcap, which negates the advantage gained from reduced facet intensity through beam expansion. The endcap 206 here does not need such passive core waveguides in order to couple a beam (such as the signal beam 202) into the core region 210.

The core region 210 represents a portion of the PWG amplifier 104 doped with an active ion species that is responsive to optical signals of at least one specific wavelength. The cladding layer 212 is optically transparent and contacts the core region 210. The signal beam 202 from the master oscillator 102 is coupled into the core region 210, and the pump light 204 from the pump source 106 is coupled into the pump guide (the core region 210 and the cladding layer 212) to provide pump power for optical amplification. In some embodiments, a portion of the pump light 204 can be coupled into the core region 210 but is not coupled into the angular acceptance (numeric aperture) of the core region 210. The indexes of refraction and dielectric constants of the core region 210 and the cladding layer 212 differ and create a boundary that reflects optical signals in the core region 210. A cooling fluid 214 opposite the cladding layer 212 is used to cool the PWG amplifier 104. The indexes of refraction and dielectric constants of the core region 210/cladding layer 212 and the cooling fluid 214 differ and create another boundary that reflects the optical signals in the core region 210. This helps to confine optical signals primarily in the core region 210, where optical amplification can occur.

The core region 210 can be formed using glass, such as fused silica or borosilicate glass. The core region 210 also includes any suitable dopant material or materials that promote optical amplification. While not shown here, a thin layer of undoped fused silica or other glass with a suitable refractive index could separate the core region 210 from the cooling fluid 214 to help maintain clean guiding conditions within the core region 210. However, there is no need for a thermo-optic interface (TOI) material between the core region 210 and the cooling fluid 214, which is beneficial since TOI materials can be easily damaged by stray pump light. The cladding layer 212 can include glass, such as fused silica, which is lower in refractive index than the core region 210 and lacks any dopant material that promotes optical amplification. The cooling fluid 214 represents any suitable cooling fluid, such as water, that provides cooling for the PWG amplifier 104. The cooling fluid 214 also has a refractive index that is lower than the core region 210 and the cladding layer 212 to provide total internal reflection at the glass-fluid interface (the core region-cooling liquid interface).

As can be seen in FIG. 2, the cladding layer 212 can be tapered such that it transitions from a larger thickness near the endcap 206 to a smaller thickness near the endcap 208. This tapering allows for more control over the rate of pump absorption in the PWG amplifier 104 and therefore the generation of heat in the PWG amplifier 104. This tapering also provides a larger surface area of the cladding layer 212 near the endcap 206, which provides a larger aperture to increase or maximize the coupling of the pump light 204 into the pump guide. The tapering further helps to reduce or minimize heat and stress at the entrance to the doped core region 210 and increases the rate of pump absorption upon propagation, which helps to keep the heat load much more uniform along the length of the PWG amplifier 104. With the increasing rate of pump absorption approaching the narrow end of the taper, near-complete pump absorption is possible without the need for dichroic layers, which can be easily damaged.

A structural backbone 216 extends along the length of the cladding layer 212 between the endcaps 206 and 208. The structural backbone 216 provides support and structural reinforcement for the core region 210 and the cladding layer 212. Such structural reinforcement may be needed or desired, for example, since the core region 210 is not encased on both top and bottom by cladding layers (and thus lacks the structural support that normally comes with the use of multiple cladding layers). The structural backbone 216 can be formed from glass, such as fused silica, or other suitable optically transparent materials. Since the thickness of the structural backbone 216 does not affect the optical performance of the PWG amplifier 104, the thickness can be chosen to meet mechanical mounting requirements or other mechanical requirements of the amplifier 104. As can be seen in FIG. 2, the structural backbone 216 can be tapered such that it transitions from a larger thickness near the endcap 208 to a smaller thickness near the endcap 206. This tapering is opposite the tapering of the cladding layer 212 and may allow the cladding layer 212 and the structural backbone 216 to have a combined thickness that is substantially uniform along the span between the endcaps 206 and 208. Note, however, that as with the cladding layer 212, tapering of the structural backbone 216 is not required, and the structural backbone 216 could have a uniform or substantially uniform thickness or some other non-uniform thickness.

A layer 218 of low refractive index material can be positioned between the cladding layer 212 and the structural backbone 216. The low refractive index layer 218 helps to optically decouple the cladding layer 212 from the structural backbone 216. More specifically, the layer 218 has a lower refractive index than both the cladding layer 212 and the structural backbone 216, which helps to optically insulate the structural backbone 216 from the cladding layer 212. The layer 218 could be formed from any suitable material or materials having a low refractive index, such as magnesium fluoride ($MgF_2$) or micro- or nano-structured glass. In some embodiments, the layer 218 can be deposited or formed on the cladding layer 212 and then contact bonded or diffusion bonded to the structural backbone 216. In particular embodiments, the layer 218 can be a solid piece of material, such as magnesium fluoride, which is contact bonded or diffusion bonded to the structural backbone 216 and the cladding layer 212. Note, however, that the functions of the layer 218 and the structural backbone 216 can be combined into a single structure, such as one formed from magnesium fluoride, having a lower refractive index than the cladding layer 212 in order to optically insulate the structure from the cladding layer 212.

A heat transfer impedance or promotion layer 220 can be positioned between the core region 210 and the cooling fluid 214. The layer 220 can promote or inhibit the transfer of heat out of the core region 210 into the cooling fluid 214. Among other reasons, this could be done to reduce or eliminate thermal lensing or other non-uniform thermo-optic aberrations created in the core region 210. For example, the layer 220 could be patterned to improve heat transfer in areas that are hotter during operation of the PWG amplifier 104 or to inhibit heat transfer in areas that are cooler during operation of the PWG amplifier 104. The layer 220 could be formed from any suitable material(s) that promote or inhibit the transfer of heat, and the layer 220 could also have any suitable pattern in order to combat non-uniform thermo-optic aberrations. As particular examples, the layer 220 could be formed through micro- or nano-structuring of glass at the bottom of the core region 210 (possibly in the thin layer of undoped glass or other material separating the core region 210 from the cooling fluid 214). The layer 220 could also be formed using a micro- or nano-pattern (such as a raster) in a transparent low-conductivity coating or as variations in the thickness of a transparent low-conductivity coating applied to the bottom of the core region 210.

An auxiliary cooler 222 could optionally be used on the structural backbone 216 to remove additional heat from the PWG amplifier 104. The auxiliary cooler 222 represents any suitable structure or material(s) that promote(s) cooling, such as a heat sink or cooling fluid. In some embodiments, the PWG amplifier 104 could be substantially or completely immersed in a cooling fluid 214, in which case the cooling fluid 214 could also function as the auxiliary cooler 222.

The entire structure shown in FIG. 2 could have any suitable size, shape, and dimensions. In some embodiments, the core region 210, cladding layer 212, structural backbone 216, and layers 218-220 could have a length (measured between the endcaps 206 and 208) of about 0.3 meters to about 0.6 meters. Also, in some embodiments, the cladding layer 212 could have an input aperture of about 21.4 millimeters to about 171.2 millimeters in width and about 3.2 millimeters in height, and an output aperture of about 21.4 millimeters to about 171.2 millimeters in width and about 0.8 millimeters in height. However, any other suitable sizes for these components could be used.

The design of the PWG amplifier 104 shown in FIG. 2 can offer various advantages or benefits depending on the implementation. For example, with most or all components formed from glass, standard bonding techniques could be used to couple the components together and form the PWG amplifier 104. This can simplify and reduce the cost of manufacturing the PWG amplifier 104. Also, the use of glass means that most components (possibly all except the core region 210) are non-absorbing, so any stray pump light 204 could propagate in non-absorbing media and be diluted and then more easily terminated. Further, the PWG amplifier 104 is sturdier and less prone to damage compared to conventional PWG amplifiers, and direct cooling of the PWG amplifier 104 can be used to support more effective cooling techniques. Moreover, the large endcaps 206 and 208 are compatible with edge cooling techniques since (i) they allow for the free expansion of a beam emerging from the core region 210 and (ii) they allow for the use of large end facets with coatings that can be more easily formed (since the coating area diameters are much larger than the pump and signal beam cross-sections). Beyond that, this design provides for reduced or minimal mounting forces being applied to the PWG amplifier 104 during installation or use, so there is little or no deformation of the components in the PWG amplifier 104. In addition, the tapering of the cladding layer 212 provides for more controlled heat dissipation within the PWG amplifier 104.

Although FIG. 2 illustrates one example of a mechanically-robust monolithic fused PWG amplifier 104, various changes may be made to FIG. 2. For example, FIG. 2 is not drawn to scale, and the relative sizes, shapes, and dimensions of the components in FIG. 2 are for illustration only. Also, the example shown in FIG. 2 illustrates both the signal beam 202 from the master oscillator 102 and the pump light 204 from the pump source 106 co-propagating in the same direction through the PWG amplifier 104. However, counter-propagation of the signal beam 202 and the pump light 204 is also possible, where the pump light 204 enters the larger face of the tapered pump guide structure and the signal beam 202 enters the smaller face of the tapered pump guide structure.

Figure 3:
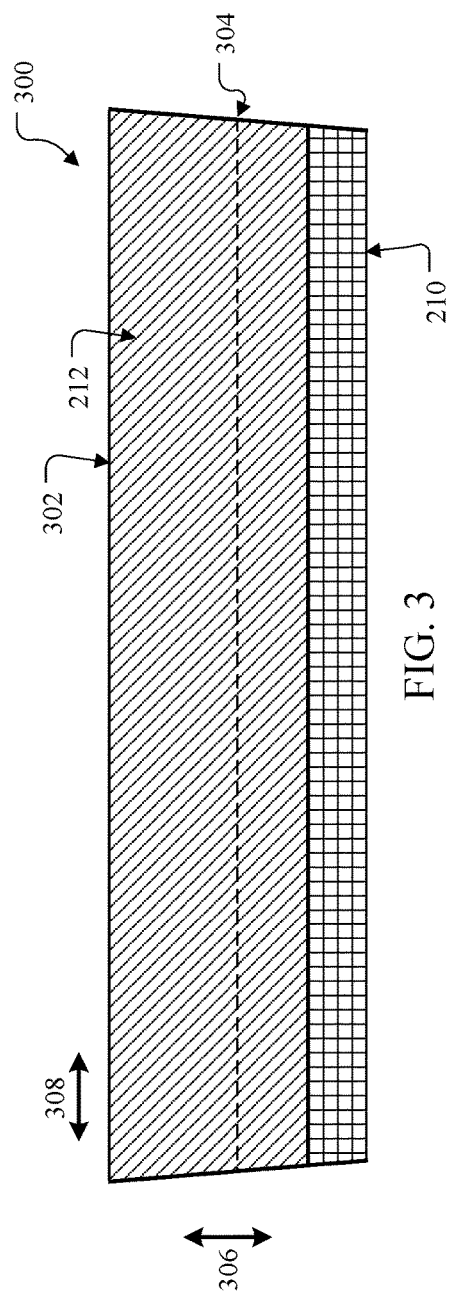
FIG. 3 illustrates an example cross-sectional view of a mechanically-robust monolithic fused PWG amplifier according to this disclosure.

FIG. 3 illustrates an example cross-sectional view 300 of a mechanically-robust monolithic fused PWG amplifier 104 according to this disclosure. In particular, FIG. 3 illustrates a cross-sectional view 300 of the PWG amplifier 104 taken through the core region 210 and the cladding layer 212 near the endcap 206. For ease of explanation, the cross-sectional view 300 of FIG. 3 is described as representing a cross-sectional view of the PWG amplifier 104 of FIG. 2. However, as noted above, various changes can be made to the PWG amplifier 104 of FIG. 2, which could alter the cross-sectional view of the PWG amplifier 104 shown in FIG. 3.

As shown in FIG. 3, the PWG amplifier 104 has a generally trapezoidal cross-section, where sides of the PWG amplifier 104 are angled for suppression of parasitic lasing. The PWG amplifier 104 includes the core region 210 and the cladding layer 212. Both the core region 210 and the cladding layer 212 are also generally trapezoidal in their cross-sections, with the core region 210 having a high aspect ratio. The cladding layer 212 in this cross-sectional view 300 has a thickness defined as the distance between the top of the core region 210 and a top surface 302 of the cladding layer 212. In embodiments having a tapered cladding layer 212, the top surface 302 is angled towards the core region 210 and eventually reaches a low point defined by a dashed line 304 near the endcap 208. As noted above, however, the cladding layer 212 need not be tapered.

The PWG amplifier 104 here includes a "fast" axis 306 that is narrower and a "slow" axis 308 that is broader. The PWG amplifier 104 operates to guide optical signals in the core region 210 in the narrower fast axis direction but not in the broader slow axis dimension. The fast axis 306 helps to confine a beam in the core region 210 to its lowest-order mode, thereby providing near diffraction-limited beam quality in that dimension. The slow axis 308 is generally unguided, but the PWG amplifier 104 is lossy in the slow axis direction. As a result, high beam quality is preserved after amplification in the PWG amplifier 104.

The angling of the sides of the cross-section in FIG. 3 can help to provide parasitic suppression in the PWG amplifier 104. While the angled sides here are included in the core region 210 and the cladding layer 212, the core region 210 could have angled sides while the cladding layer 212 does not. The angle of the sides can depend on the numeric aperture of the core region 210 and could be relatively small, such as around 3°. The angle of the sides could also be reversed so that the PWG amplifier 104 is wider on bottom and narrower on top. The angling of the sides may or may not extend into the structural backbone 216. Note that it is also possible to omit the angling of the sides in the cross-section and to provide parasitic suppression in other ways, such as when fine grinding of the sides of the core region 210 is used.

Although FIG. 3 illustrates one example of a cross-sectional view 300 of a mechanically-robust monolithic fused PWG amplifier 104, various changes may be made to FIG. 3. For example, while the cross-sectional view 300 is trapezoidal here, any other suitable cross-sectional shape could be used, depending (among other things) on the shapes of the core region 210, the cladding layer 212, and other layers of the PWG amplifier 104.

Figure 4:
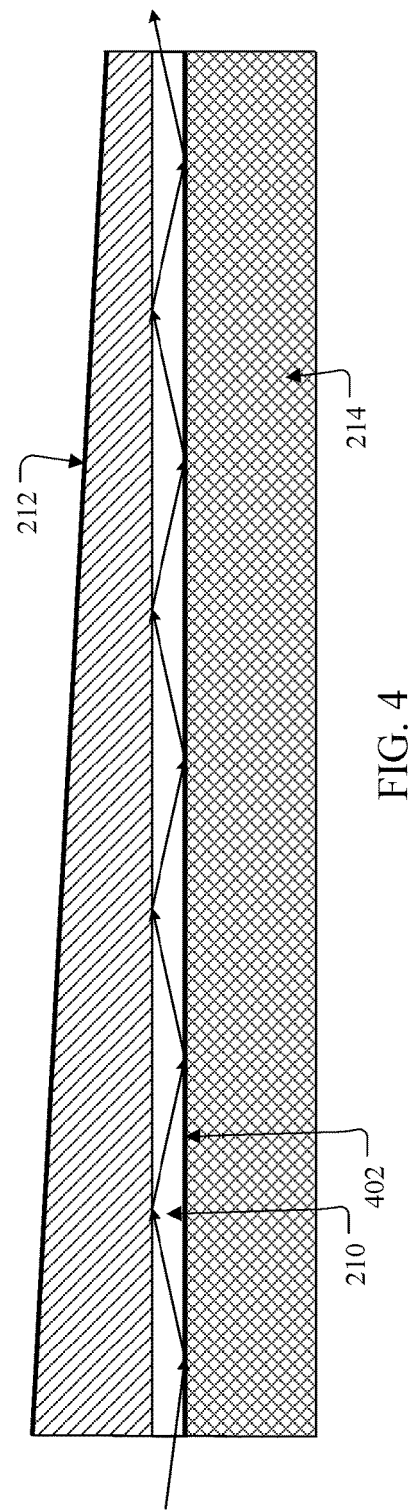
FIG. 4 illustrates example internally-reflective interfaces in a mechanically-robust monolithic fused PWG amplifier according to this disclosure.

FIG. 4 illustrates example internally-reflective interfaces in a mechanically-robust monolithic fused PWG amplifier 104 according to this disclosure. For ease of explanation, the interfaces shown in FIG. 4 are described as involving the PWG amplifier 104 of FIG. 2. However, as noted above, various changes can be made to the PWG amplifier 104 of FIG. 2. Also, note that the cross-hatching in the core region 210 has been removed in FIG. 4 for ease of illustration.

As shown in FIG. 4, reflection boundaries exist at the top and bottom of the core region 210. The reflection boundaries are created due to differences in refractive indexes and dielectric constants of the core region 210 and the cladding layer 212 and of the core region 210/cladding layer 212 and the cooling fluid 214. The cooling fluid 214 can be selected to provide a proper refractive index so that the reflection boundary is created at the bottom of the core region 210. As noted above, however, a layer 402 of undoped glass (with a refractive index lower than the core region 210 and the cladding layer 212, such as a refractive index matching the cladding layer 212) or other undoped material could be included to separate the doped portion of the core region 210 from the cooling fluid 214. This layer 402 could be very thin (such as about 10 μm thick). The use of the layer 402 may be necessary or desirable since the bottom face of the core region 210 can be very sensitive optically and is often highly polished, so that face needs to be protected. Such protective layers 402 can be easily manufactured, such as by using current waveguide growth processes or other conventional processes.

The use of the cooling fluid 214 along the bottom of the core region 210 can be advantageous for several reasons. For example, conventional YAG PWG amplifiers often include cladding layers, e-wave layers, thermo-optic interface (TOI) layers, and heat sinks on both sides of a core region. The PWG amplifier 104 here does not require cladding and e-wave layers on both sides of the core region 210. Instead, the cooling fluid 214 allows excess light to escape the core region 210 and functions as a heat sink for the core region 210. This can greatly simplify the design of the PWG amplifier 104 compared to conventional designs and can avoid the use of combustible materials like graphite (which can be used as a thermal contact material, but is also an absorber, in the TOI layers).

Although FIG. 4 illustrates one example of internally-reflective interfaces in a mechanically-robust monolithic fused PWG amplifier 104, various changes may be made to FIG. 4. For example, while a zigzag path is shown here to illustrate the internal reflection boundaries, only a single mode of the actual signal beam 202 from the master oscillator 102 could propagate through the core region 210.

Figure 5:
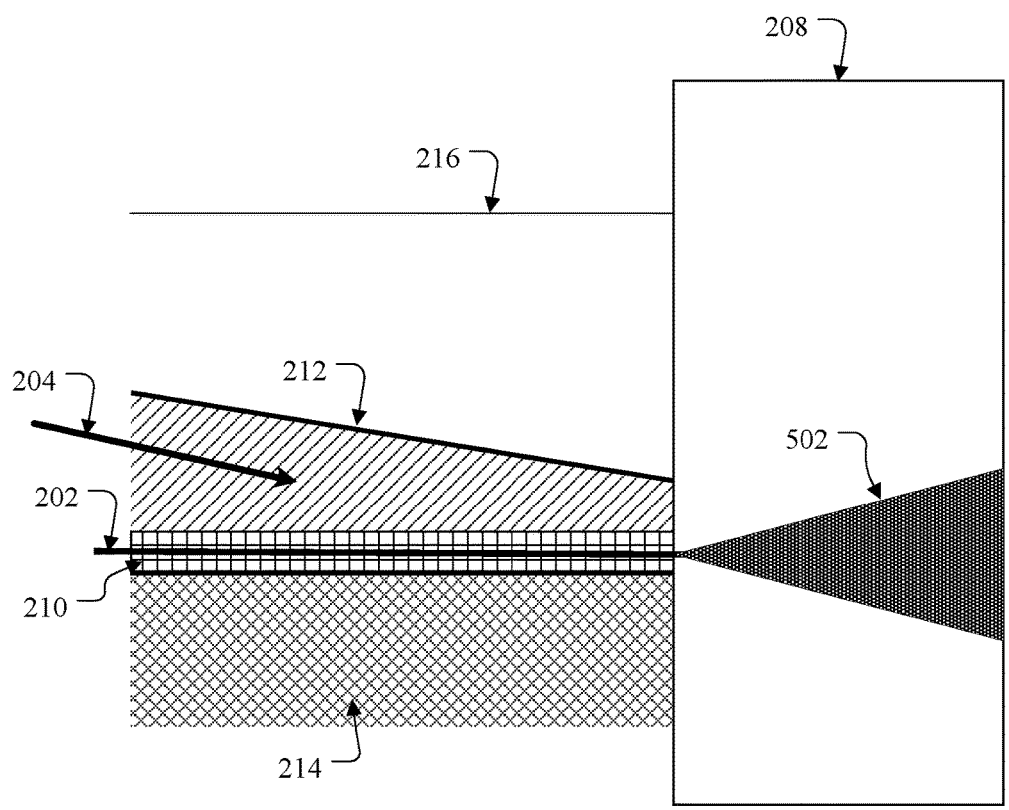
FIG. 5 illustrates an example beam expansion of an output beam in a mechanically-robust monolithic fused PWG amplifier according to this disclosure.

FIG. 5 illustrates an example beam expansion of an output beam 118 in a mechanically-robust monolithic fused PWG amplifier 104 according to this disclosure. For ease of explanation, the beam expansion shown in FIG. 5 is described as involving the PWG amplifier 104 of FIG. 2. However, as noted above, various changes can be made to the PWG amplifier 104 of FIG. 2.

As shown in FIG. 5, the endcap 208 can be bonded directly to the core region 210, the cladding layer 212, and the structural backbone 216. This can be easily accomplished, for example, since these components can be fabricated using glass and conventional glass bonding techniques (such as diffusion bonding) can be used. This bonding can also help to create a fluid-tight seal that prevents leakage of the cooling fluid 214.

The endcap 208 also allows for beam expansion of the high-power output beam 118 generated by the PWG amplifier 104. In this example, the high-power output beam 118 undergoes beam expansion to achieve a widened beam pattern 502 within the endcap 208. The output beam 118 with the widened beam pattern 502 can then exit the endcap 208. This widening can occur since the endcap 208 is a passive unguided endcap. This type of free beam expansion can be beneficial since it lowers the intensity of the output beam 118 at the air/glass interface on the right side of the endcap 208 in FIG. 5.

It should also be denoted that the same type of beam pattern shown in

FIG. 5 could also or alternatively be used in the input endcap (which in FIG. 2 denotes the endcap 206). Rather than beam expansion, this type of beam pattern in the input endcap allows focusing of an input beam (such as the signal beam 202) into the core region 210 through the input endcap. This would allow the input beam to achieve a narrower beam pattern prior to coupling into the core region 210. Because one or both of the endcaps 206 and 208 can overhang the core region 210 and the cladding layer 212, one or both endcaps 206 and 208 can allow for one or both of unobstructed free beam focusing (for input beams) or unobstructed free beam expansion (for output beams).

Although FIG. 5 illustrates one example of beam expansion of an output beam 118 in a mechanically-robust monolithic fused PWG amplifier 104, various changes may be made to FIG. 5. For example, the expansion of the output beam 118 could vary as needed or desired to result in other widened beam patterns 502 depending on the size and other parameters of the endcap 208 or other features of the PWG amplifier 104. Also, the signal beam 202 could counter-propagate against the pump light 204 as noted above, so the beam expansion shown here could occur in the endcap 206 rather than the endcap 208.

Figure 6:
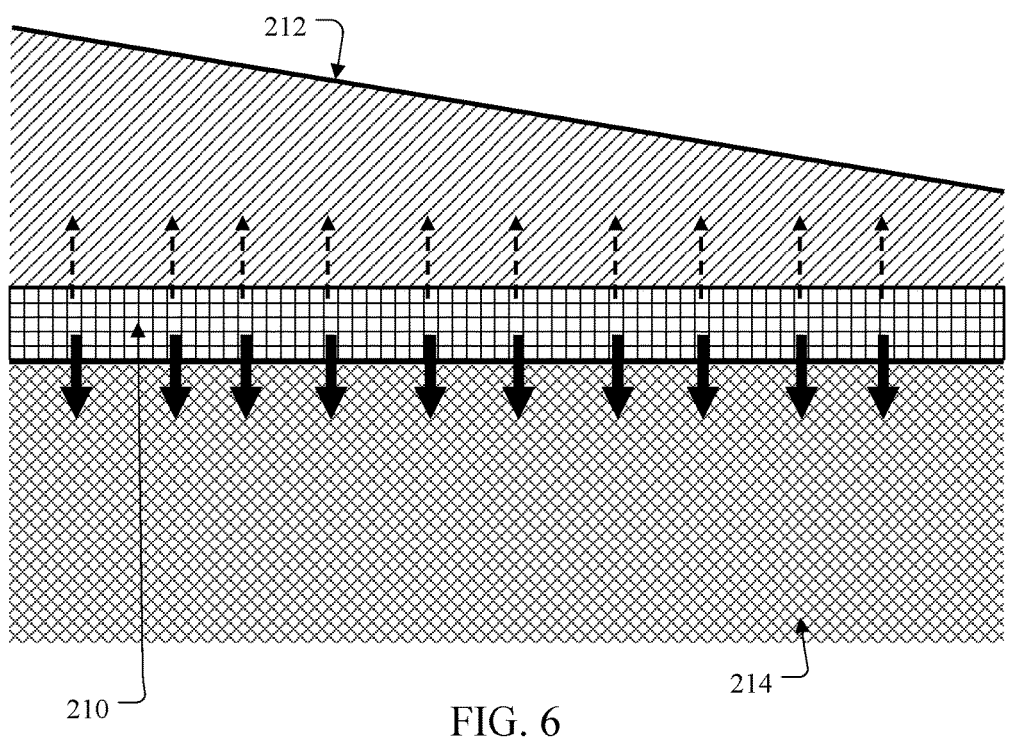
FIG. 6 illustrates example heat flow during steady-state operation in a mechanically-robust monolithic fused PWG amplifier according to this disclosure.

FIG. 6 illustrates example heat flow during steady-state operation in a mechanically-robust monolithic fused PWG amplifier 104 according to this disclosure. For ease of explanation, the heat flow shown in FIG. 6 is described as involving the PWG amplifier 104 of FIG. 2. However, as noted above, various changes can be made to the PWG amplifier 104 of FIG. 2.

As shown in FIG. 6, at least some of the pump light 204 from the pump source 106 travels through the tapered cladding layer 212. The tapering of the cladding layer 212 allows the rate of absorption of the pump light 204 into the core region 210 to be controlled. Since the absorption of the pump light 204 leads to the generation of heat, this tapering also allows the rate of heat generation in the PWG amplifier 104 caused by the absorption of the pump light 204 to be controlled. Thus, at the thicker end of the taper where the pump light 204 is coupled, the rate of pump absorption is intentionally kept low to make the generated heat more manageable. The generated heat can then be removed via the cooling fluid 214 or through the structural backbone 216 (and optionally via the auxiliary cooler 222). As noted above, near-complete pump absorption can be achieved here without the need for dichroic layers.

The rate of pump absorption accelerates towards the exit facet of the cladding layer 212. This is because the rate of absorption increases as the size of the cladding layer 212 decreases. As a result, there is a smaller absorption rate at the input facet of the cladding layer 212 (where the cladding layer 212 is thicker) and a larger absorption rate at the output facet of the cladding layer 212 (where the cladding layer 212 is thinner). This can help to reduce the transmitted pump power to a more manageable level in the laser system 100. Moreover, there can be non-critical termination of transmitted pump light 204 near the exit facet of the cladding layer 212. Because the cross-sectional size of the cladding layer 212 near the exit facet of the cladding layer 212 can be very narrow, the pump light 204 would not be guided at that point, and any remaining pump light 204 can dissipate into free space.

Note that in this tapered structure, the intrinsic divergence of the propagating pump light 204 increases, such as through reflections from the taper walls. Ideally, the pump light 204 is coupled into the PWG amplifier 104 such that it fills the cladding layer's input aperture, although some amount of spill can be easily accommodated in the optically transparent structure. Filling the cladding layer's input aperture helps to minimize the intrinsic divergence of the pump light 204 compared to a coupling a spot that under-fills the input aperture. Upon propagation, the intrinsic divergence increases. If the taper of the cladding layer 212 becomes too thin, the intrinsic divergence of the pump light 204 exceeds the numeric aperture of the pump guide (the core region 210 and the cladding layer 212), and the high angular content of the pump light 204 will start to leak out of the pump guide. One design option is to select the angle of the taper such that the pump divergence never exceeds the pump guide. Another option is to allow residual pump light 204 to spill out at the end of the taper. Given the optically transparent structure, the spilled light could propagate until it hits housing walls or other structures, where it can be non-critically terminated.

It is often necessary or desirable to keep the pump light 204 guided over the full length of the taper and to achieve maximum pump absorption. To maintain guiding throughout, the output cross section of the pump guide cannot be made arbitrarily thin since the intrinsic divergence of the pump light 204 increases inversely to the taper's thickness. Eventually, the intrinsic divergence exceeds the guide acceptance, and light leaks out of the waveguide. To achieve complete guiding within a given device length, two conditions could be met. The pump spot at the input side fills the full cross-section of the pump guide, and the intrinsic beam divergence at the output facet does not exceed the pump guide's acceptance. It should be mentioned that the pump guide has an angular acceptance range at the input side. To fully utilize the guiding capability of the tapered pump guide, the pump input angular spread can be centered on the angular acceptance. If it is not centered, light can leak out of the tapered structure. If the leaking happens after most of the pump light 204 has been absorbed, such leaking may be desirable to terminate the pump beam in a diffuse fashion. In some embodiments, the pump spot can be matched to the input facet of the pump guide. Upon propagation through the tapered cladding layer 212, the pump angular spread can be matched to the cladding angular acceptance at the exit facet of the pump guide. The matching of the pump spot size and the angular spread can be used to increase the efficiency of the laser system 100.

Although FIG. 6 illustrates one example of heat flow during steady-state operation in a mechanically-robust monolithic fused PWG amplifier 104, various changes may be made to FIG. 6. For example, the actual generation of heat in the PWG amplifier 104 can vary based on a number of factors, including the size and shape of the cladding layer 212 and the amount of taper of the cladding layer 212. Also, as noted above, the cladding layer 212 need not be tapered and could have a uniform or substantially uniform thickness or some other non-uniform thickness.

Figure 7:
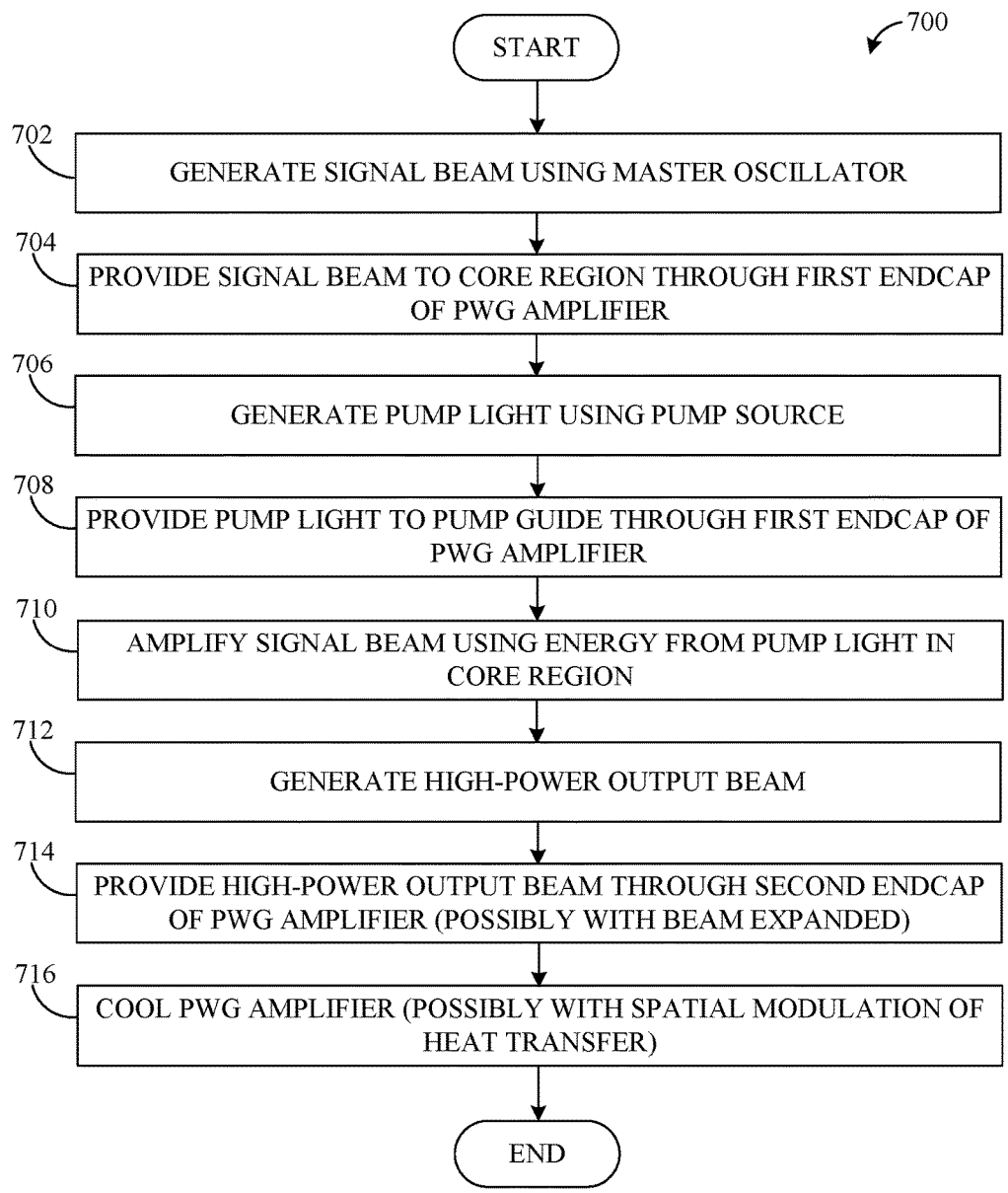
FIG. 7 illustrates an example method for generating a high-power laser signal using a mechanically-robust monolithic fused PWG amplifier according to this disclosure.

FIG. 7 illustrates an example method 700 for generating a high-power laser signal using a mechanically-robust monolithic fused PWG amplifier 104 according to this disclosure. For ease of explanation, the method 700 is described as involving the use of the PWG amplifier 104 of FIG. 2 operating in the laser system 100 of FIG. 1. However, the method 700 could involve the use of any suitable PWG amplifier in any suitable system.

As shown in FIG. 7, a signal beam is generated using a master oscillator at step 702, and the signal beam is provided to a core region of a PWG amplifier through a first endcap of the PWG amplifier at step 704. This could include, for example, the master oscillator 102 generating a signal beam 202 having a continuous wave, continuous pulse train, pulse burst, or other waveform. This could also include the master oscillator 102 providing the signal beam 202 to the PWG amplifier 104 via the relay optics 108, beam controller 110, and relay optics 112. This could further include the signal beam 202 passing through the endcap 206 into the core region 210 of the PWG amplifier 104. The core region 210 is formed from doped glass or other doped material, and the endcap 206 is formed from glass or other material.

Pump light is generated using a pump source at step 706, and the pump light is provided to the pump guide (the core region and the cladding layer) of the PWG amplifier through the first endcap of the PWG amplifier at step 708. This could include, for example, the pump source 106 generating pump light 204. This could also include the pump light 204 passing through the endcap 206 into the core region 210 and the cladding layer 212 of the PWG amplifier 104. The cladding layer 212 is formed from glass or other material and can be tapered so that the cladding layer 212 is thicker near the endcap 206 and gradually decreases in thickness along the PWG amplifier 104.

The signal beam is amplified in the core region using the energy from the pump light at step 710. This could include, for example, the core region 210 guiding the signal beam in the fast axis 306 but not the slow axis 308 of the core region 210. This leads to the generation of a high-power output beam at step 712, which is provided through a second endcap of the PWG amplifier at step 714. This could include, for example, the core region 210 outputting the high-power output beam 118 to the endcap 208. The endcap 208 is formed from glass or other material. Optionally, beam expansion can occur in the endcap 208 during this time.

The PWG amplifier is cooled during its operation at step 716. This could include, for example, the cooling fluid 214 removing heat from the core region 210. This could also include the auxiliary cooler 222 removing heat from the structural backbone 216 and the cladding layer 212. During this process, the heat transfer from the core region 210 can experience spatial modulation, such as when the heat transfer is improved or impeded in certain areas. This could occur using the heat transfer impedance or promotion layer 220, which can help to compensate for thermal lensing or other non-uniform thermo-optic aberrations.

Although FIG. 7 illustrates one example of a method 700 for generating a high-power laser signal using a mechanically-robust monolithic fused PWG amplifier 104, various changes may be made to FIG. 7. For example, while shown as a series of steps, various steps in FIG. 7 could overlap, occur in parallel, occur in a different order, or occur any number of times. Also, counter-propagation of the signal beam 202 and the pump light 204 is also possible, so the signal beam 202 would enter and exit different endcaps 206 and 208 than those described above.

Figure 8:
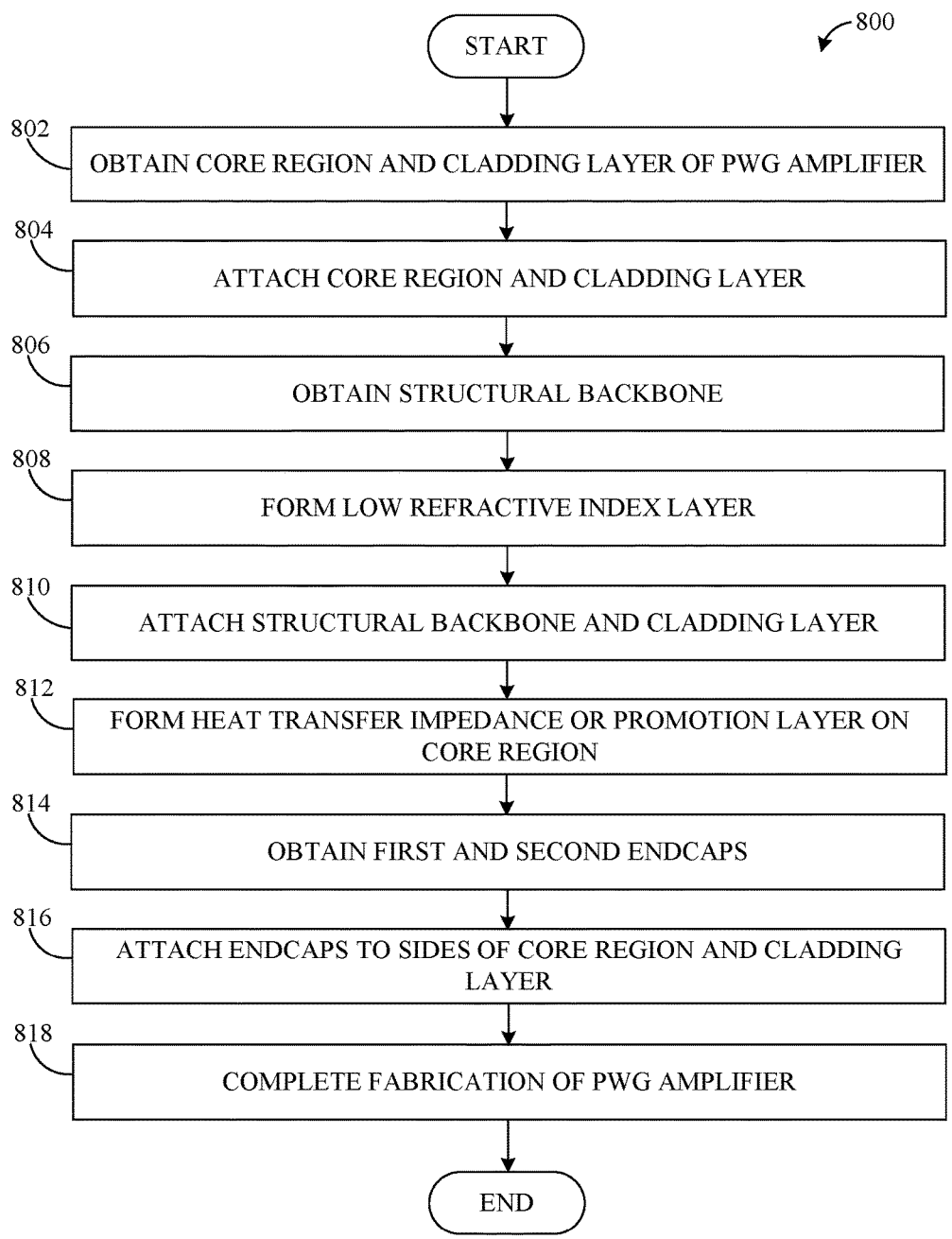
FIG. 8 illustrates an example method for fabricating a mechanically-robust monolithic fused PWG amplifier according to this disclosure.

FIG. 8 illustrates an example method 800 for fabricating a mechanically-robust monolithic fused PWG amplifier according to this disclosure. For ease of explanation, the method 800 is described as involving the manufacture of the PWG amplifier 104 of FIG. 2. However, the method 800 could involve the manufacture of any suitable PWG amplifier.

As shown in FIG. 8, a core region and a cladding layer of a PWG amplifier are obtained at step 802 and attached to each other at step 804. This could include, for example, forming a core region 210 from doped glass (such as pre-doped glass or glass that is then doped) and forming a cladding layer 212 from glass. The cladding layer 212 is tapered in some embodiments. Forming the core region 210 and the cladding layer 212 could also include using a glass bonding technique, such as contact or diffusion bonding, to couple the core region 210 and the cladding layer 212. Note that the core region 210 and the cladding layer 212 could also be formed from an integral piece of glass, where part of the glass is doped to form the core region 210 and the undoped portion forms the cladding layer 212.

A structural backbone is obtained at step 806. This could include, for example, forming a structural backbone 216 using glass. A low refractive index layer is formed at step 808, and the structural backbone is attached to the cladding layer at step 810. This could include, for example, depositing magnesium fluoride or other material on the cladding layer 212 or patterning the surface of the cladding layer 212 to form the low refractive index layer 218. The low refractive index layer 218 could also or alternatively be formed on the structural backbone 216. This could also include using a glass bonding technique, such as contact or diffusion bonding, to couple the structural backbone 216 and the cladding layer 212. As noted above, however, the functionalities of the low refractive index layer 218 and the structural backbone 216 could be combined, such as by forming the structural backbone 216 using a low refractive index material.

A heat transfer or impedance layer can be formed on the core region at step 812. This could include, for example, forming the heat transfer impedance or promotion layer 220 by structuring or patterning the bottom surface of the core region 210 or by altering the thickness of a coating applied to the bottom surface of the core region 210. As noted above, however, the large face of the core region 210 adjacent to the cooling fluid 214 can be highly sensitive and can therefore be protected using the protective layer 402. In those cases, the protective layer 402 can be patterned to tailor the heat transfer impedance. The pattern or design of the layer 220 can be based on the expected non-uniform generation of heat by the core region 210 and ideally helps to compensate for such non-uniform generation of heat.

First and second endcaps are obtained at step 814 and attached to sides of the core region and cladding layer at step 816. This could include, for example, forming the endcaps 206 and 208 from glass. This could also include using a glass bonding technique, such as contact or diffusion bonding, to couple the core region 210 and the cladding layer 212 to the endcaps 206 and 208.

Fabrication of the PWG amplifier is completed at step 818. This could include, for example, performing any other steps to form a completed PWG amplifier 104. Example operations here could include applying the auxiliary cooler 222 to the structural backbone 216, applying coatings to the endcaps 206 and 208, supplying the cooling fluid 214 to the PWG amplifier 104, or performing any other suitable operations to form a completed PWG amplifier 104. The PWG amplifier 104 could be mounted using the endcaps 206 and 208 or used in any other suitable manner.

The following describes a specific implementation of the method 800 for fabricating the PWG structure, where it is assumed that each endcap 206 and 208 is actually formed using multiple pieces of material. The corners of the core region 210 can be difficult to polish, such as due to the existence of micro-cracks in the core region 210. It could be much easier to polish the large faces of the core region 210 with portions of the endcaps 206 and 208 already attached to the core region 210. Thus, portions of the endcaps 206 and 208 could be attached to the core region 210, cladding layer 212, and structural backbone 216, such as by using glass bonding or other techniques. The bottoms of the portions of the endcaps 206 and 208 can then be polished to have the same planar level as the bottom surface of the core region 210. If needed or desired, additional material can be added to the bottoms of the already-attached portions of the endcaps 206 and 208. With appropriate diffusion bonding or other techniques, the different portions of each endcap 206 and 208 function as a single integrated endcap. The bottom portion of each endcap 206 and 208 may extend into the volume where the cooling fluid 214 interacts with the core region's face. This approach helps to structurally secure the sensitive corner areas of the core region 210.

Although FIG. 8 illustrates one example of a method 800 for fabricating a mechanically-robust monolithic fused PWG amplifier 104, various changes may be made to FIG. 8. For example, while shown as a series of steps, various steps in FIG. 8 could overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a planar waveguide (PWG) amplifier having a narrower fast axis dimension and a broader slow axis dimension, the PWG amplifier comprising a core region, a cladding layer, and a rigid structural backbone attached to the cladding layer opposite the core region, the PWG amplifier configured to receive pump light, the core region configured to amplify an input beam using energy from the pump light to generate an amplified output beam; and a cooling fluid configured to cool the core region, the cladding layer having a lower refractive index than the core region and the cooling fluid having a lower refractive index than the core region and the cladding layer such that the cladding layer and the cooling fluid support guiding of the input beam and the pump light in the fast axis dimension within the PWG amplifier;

the PWG amplifier also comprising first and second endcaps attached to opposite faces of the core region, the cladding layer, and the structural backbone, the first endcap configured to pass the input beam to the core region, the second endcap configured to pass the amplified output beam from the core region;

wherein the core region, the cladding layer, and the endcaps collectively form a monolithic fused structure; and wherein each of the endcaps has a major outer surface that is larger in area than a combined area of the faces of the core region, the cladding layer, and the structural backbone to which the endcap is attached.

2. The apparatus of claim 1, wherein the structural backbone is configured to provide structural reinforcement for the core region and the cladding layer.

3. The apparatus of claim 1, wherein:

the PWG amplifier further comprises a layer of material on the core region or on an undoped protective layer for the core region opposite the cladding layer; and the layer of material is configured to promote or impede heat transfer from the core region to the cooling fluid in one or more areas of the core region in order to compensate for non-uniform heating of the core region.

4. An apparatus comprising:

a planar waveguide (PWG) amplifier comprising a core region and a cladding layer, the PWG amplifier configured to receive pump light, the core region configured to amplify an input beam using energy from the pump light to generate an amplified output beam; and a cooling fluid configured to cool the core region, the cooling fluid having a lower refractive index than the core region and the cladding layer in order support guiding of the input beam and the pump light within the PWG amplifier;

the PWG amplifier also comprising first and second endcaps attached to opposite faces of the core region and the cladding layer;

wherein the core region, the cladding layer, and the endcaps collectively form a monolithic fused structure;

wherein each of the endcaps has a major outer surface that is larger in area than a combined area of the faces of the core region and the cladding layer to which the endcap is attached;

wherein the PWG amplifier further comprises a structural backbone attached to the cladding layer opposite the core region, the structural backbone configured to provide structural reinforcement for the core region and the cladding layer;

wherein the cladding layer tapers from a larger thickness adjacent the first endcap to a smaller thickness adjacent the second endcap; and wherein the structural backbone tapers from a larger thickness adjacent the second endcap to a smaller thickness adjacent the first endcap.

5. An apparatus comprising:

a planar waveguide (PWG) amplifier comprising a core region and a cladding layer, the PWG amplifier configured to receive pump light, the core region configured to amplify an input beam using energy from the pump light to generate an amplified output beam; and a cooling fluid configured to cool the core region, the cooling fluid having a lower refractive index than the core region and the cladding layer in order support guiding of the input beam and the pump light within the PWG amplifier;

the PWG amplifier also comprising first and second endcaps attached to opposite faces of the core region and the cladding layer;

wherein the core region, the cladding layer, and the endcaps collectively form a monolithic fused structure;

wherein each of the endcaps has a major outer surface that is larger in area than a combined area of the faces of the core region and the cladding layer to which the endcap is attached;

wherein the PWG amplifier further comprises a structural backbone attached to the cladding layer opposite the core region, the structural backbone configured to provide structural reinforcement for the core region and the cladding layer; and wherein the structural backbone has a lower refractive index than the cladding layer in order to optically insulate the structural backbone from the cladding layer.

6. An apparatus comprising:

a planar waveguide (PWG) amplifier comprising a core region and a cladding layer, the PWG amplifier configured to receive pump light, the core region configured to amplify an input beam using energy from the pump light to generate an amplified output beam; and a cooling fluid configured to cool the core region, the cooling fluid having a lower refractive index than the core region and the cladding layer in order to support guiding of the input beam and the pump light within the PWG amplifier;

the PWG amplifier also comprising first and second endcaps attached to opposite faces of the core region and the cladding layer;

wherein the core region, the cladding layer, and the endcaps collectively form a monolithic fused structure;

wherein each of the endcaps has a major outer surface that is larger in area than a combined area of the faces of the core region and the cladding layer to which the endcap is attached;

wherein the PWG amplifier further comprises a structural backbone attached to the cladding layer opposite the core region, the structural backbone configured to provide structural reinforcement for the core region and the cladding layer;

wherein the PWG amplifier further comprises a layer of material having a lower refractive index than the cladding layer and the structural backbone; and wherein the layer of material is configured to optically insulate the structural backbone from the cladding layer.

7. An apparatus comprising:

a planar waveguide (PWG) amplifier having a narrower fast axis dimension and a broader slow axis dimension, the PWG amplifier comprising a core region and a cladding layer, the PWG amplifier configured to receive pump light, the core region configured to amplify an input beam using energy from the pump light to generate an amplified output beam; and a cooling fluid configured to cool the core region, the cladding layer having a lower refractive index than the core region and the cooling fluid having a lower refractive index than the core region and the cladding layer such that the cladding layer and the cooling fluid support guiding of the input beam and the pump light in the fast axis dimension within the PWG amplifier;

the PWG amplifier also comprising first and second endcaps attached to opposite faces of the core region and the cladding layer, the first endcap configured to pass the input beam to the core region, the second endcap configured to pass the amplified output beam from the core region;

wherein each of the endcaps has a major outer surface that is larger in area than a combined area of the faces of the core region and the cladding layer to which the endcap is attached; and wherein the PWG amplifier comprises a monolithic fused silica glass structure.

8. An apparatus comprising:
a planar waveguide (PWG) amplifier comprising a core region and a cladding layer, the PWG amplifier configured to receive pump light, the core region configured to amplify an input beam using energy from the pump light to generate an amplified output beam; and
a cooling fluid configured to cool the core region, the cooling fluid having a lower refractive index than the core region and the cladding layer in order support guiding of the input beam and the pump light within the PWG amplifier;
the PWG amplifier also comprising first and second endcaps attached to opposite faces of the core region and the cladding layer;
wherein the core region, the cladding layer, and the endcaps collectively form a monolithic fused structure;
wherein each of the endcaps has a major outer surface that is larger in area than a combined area of the faces of the core region and the cladding layer to which the endcap is attached; and
wherein all components of the PWG amplifier except the core region are substantially non-absorbing at wavelengths of the input beam and the pump light.

9. A system comprising:
a master oscillator configured to generate an input beam;
a pump source configured to generate pump light; and
a planar waveguide (PWG) amplifier having a narrower fast axis dimension and a broader slow axis dimension, the PWG amplifier configured to amplify the input beam and generate an amplified output beam using the pump light;
wherein the PWG amplifier comprises:
  a core region, a cladding layer, and a rigid structural backbone attached to the cladding layer opposite the core region, the core region configured to amplify the input beam using energy from the pump light to generate the amplified output beam;
  a cooling fluid configured to cool the core region, the cladding layer having a lower refractive index than the core region and the cooling fluid having a lower refractive index than the core region and the cladding layer such that the cladding layer and the cooling fluid support guiding of the input beam and the pump light in the fast axis dimension within the PWG amplifier; and
  first and second endcaps attached to opposite faces of the core region, the cladding layer, and the structural backbone, the first endcap configured to pass the input beam to the core region, the second endcap configured to pass the amplified output beam from the core region;
  wherein the core region, the cladding layer, and the endcaps collectively form a monolithic fused structure; and
  wherein each of the endcaps has a major outer surface that is larger in area than a combined area of the faces of the core region, the cladding layer, and the structural backbone to which the endcap is attached.

10. The system of claim 9, wherein the structural backbone is configured to provide structural reinforcement for the core region and the cladding layer.

11. The system of claim 9, wherein:
the PWG amplifier further comprises a layer of material on the core region or on an undoped protective layer for the core region opposite the cladding layer; and
the layer of material is configured to promote or impede heat transfer from the core region to the cooling fluid in one or more areas of the core region in order to compensate for non-uniform heating of the core region.

12. The system of claim 9, wherein the PWG amplifier comprises a monolithic fused silica glass structure.

13. The system of claim 9, further comprising:
a feedback loop configured to control at least one of the master oscillator, the pump source, and the PWG amplifier based on samples of the amplified output beam.

14. The system of claim 9, wherein the PWG amplifier is configured such that a portion of the pump light is coupled into the core region but is not coupled into an angular acceptance or numeric aperture of the core region.

15. A system comprising:
a master oscillator configured to generate an input beam;
a pump source configured to generate pump light; and
a planar waveguide (PWG) amplifier configured to amplify the input beam and generate an amplified output beam using the pump light;
wherein the PWG amplifier comprises:
  a core region and a cladding layer, the core region configured to amplify the input beam using energy from the pump light to generate the amplified output beam;
  a cooling fluid configured to cool the core region, the cooling fluid having a lower refractive index than the core region and the cladding layer in order to support guiding of the input beam and the pump light within the PWG amplifier;
  first and second endcaps attached to opposite faces of the core region and the cladding layer; and
  a structural backbone attached to the cladding layer opposite the core region, the structural backbone configured to provide structural reinforcement for the core region and the cladding layer;
  wherein the core region, the cladding layer, and the endcaps collectively form a monolithic fused structure;
  wherein each of the endcaps has a major outer surface that is larger in area than a combined area of the faces of the core region and the cladding layer to which the endcap is attached;
  wherein the cladding layer tapers from a larger thickness adjacent the first endcap to a smaller thickness adjacent the second endcap; and
  wherein the structural backbone tapers from a larger thickness adjacent the second endcap to a smaller thickness adjacent the first endcap.

16. A system comprising:
a master oscillator configured to generate an input beam;
a pump source configured to generate pump light; and a planar waveguide (PWG) amplifier configured to amplify the input beam and generate an amplified output beam using the pump light;
wherein the PWG amplifier comprises:
   a core region and a cladding layer, the core region configured to amplify the input beam using energy from the pump light to generate the amplified output beam;
   a cooling fluid configured to cool the core region, the cooling fluid having a lower refractive index than the core region and the cladding layer in order to support guiding of the input beam and the pump light within the PWG amplifier;
   first and second endcaps attached to opposite faces of the core region and the cladding layer; and
   a structural backbone attached to the cladding layer opposite the core region, the structural backbone configured to provide structural reinforcement for the core region and the cladding layer;
wherein the core region, the cladding layer, and the endcaps collectively form a monolithic fused structure;
wherein each of the endcaps has a major outer surface that is larger in area than a combined area of the faces of the core region and the cladding layer to which the endcap is attached;
wherein the PWG amplifier further comprises a layer of material having a lower refractive index than the cladding and the structural backbone; and
wherein the layer of material is configured to optically insulate the structural backbone from the cladding layer.

17. A system comprising:
a master oscillator configured to generate an input beam;
a pump source configured to generate pump light; and
a planar waveguide (PWG) amplifier configured to amplify the input beam and generate an amplified output beam using the pump light;
wherein the PWG amplifier comprises:
   a core region and a cladding layer, the core region configured to amplify the input beam using energy from the pump light to generate the amplified output beam;
   a cooling fluid configured to cool the core region, the cooling fluid having a lower refractive index than the core region and the cladding layer in order to support guiding of the input beam and the pump light within the PWG amplifier; and
   first and second endcaps attached to opposite faces of the core region and the cladding layer;
wherein the core region, the cladding layer, and the endcaps collectively form a monolithic fused structure;
wherein each of the endcaps has a major outer surface that is larger in area than combined area of the faces of the core region and the cladding layer to which the endcap is attached; and
wherein all components of the PWG amplifier except the core region are substantially non-absorbing at wavelengths of the input beam and the pump light.

18. A method comprising:
obtaining a planar waveguide (PWG) structure having a narrower fast axis dimension and a broader slow axis dimension, the PWG structure comprising a core region, a cladding layer, and a rigid structural backbone attached to the cladding layer opposite the core region, the PWG structure configured to receive pump light, the core region configured to amplify an input beam using energy from the pump light to generate an amplified output beam;
attaching first and second endcaps to opposite faces of the core region, the cladding layer, and the structural backbone, the first endcap configured to pass the input beam to the core region, the second endcap configured to pass the amplified output beam from the core region; and
supplying a cooling fluid configured to cool the core region, the cladding layer having a lower refractive index than the core region and the cooling fluid having a lower refractive index than the core region and the cladding layer such that the cladding layer and the cooling fluid support guiding of the input beam and the pump light in the fast axis dimension within the PWG structure;
wherein the core region, the cladding layer, and the endcaps collectively form a monolithic fused structure; and
wherein each of the endcaps has a major outer surface that is larger in area than a combined area of the faces of the core region, the cladding layer, and the structural backbone to which the endcap is attached.

19. The method of claim 18, wherein:
the cladding layer tapers from a larger thickness adjacent the first endcap to a smaller thickness adjacent the second endcap; and
the structural backbone tapers from a larger thickness adjacent the second endcap to a smaller thickness adjacent the first endcap.

20. The method of claim 18, further comprising:
forming a layer of material on the core region or on an undoped protective layer for the core region, the layer of material configured to promote or impede heat transfer from the core region to the cooling fluid in one or more areas of the core region in order to compensate for non-uniform heating of the core region.

21. The method of claim 18, wherein at least one of the first and second endcaps overhangs the core region and the cladding layer to allow at least one of:
unobstructed focusing of the input beam for coupling into the core region; and
unobstructed expansion of the amplified output beam after exiting from the core region.

22. A method comprising:
obtaining a planar waveguide (PWG) structure comprising a core region and a cladding layer, the PWG structure configured to receive pump light, the core region configured to amplify an input beam using energy from the pump light to generate an amplified output beam;
attaching first and second endcaps to opposite faces of the core region and the cladding layer;
supplying a cooling fluid configured to cool the core region, the cooling fluid having a lower refractive index than the core region and the cladding layer in order to support guiding of the input beam and the pump light within the PWG structure;
obtaining a structural backbone configured to provide structural reinforcement for the core region and the cladding layer;
attaching the structural backbone to the cladding layer; and
forming a layer of material having a lower refractive index than the cladding layer and the structural backbone, the layer of material positioned between the structural backbone and the cladding layer after attachment of the structural backbone and the cladding layer;

wherein the core region, the cladding layer, and the endcaps collectively form a monolithic fused structure; and wherein each of the endcaps has a major outer surface that is larger in area than a combined area of the faces of the core region and the cladding layer to which the endcap is attached.

23. A method comprising:

obtaining a planar waveguide (PWG) structure comprising a core region and a cladding layer, the PWG structure configured to receive pump light, the core region configured to amplify an input beam using energy from the pump light to generate an amplified output beam;

attaching first and second endcaps to opposite faces of the core region and the cladding layer; and supplying a cooling fluid configured to cool the core region, the cooling fluid having a lower refractive index than the core region and the cladding layer in order to support guiding of the input beam and the pump light within the PWG structure;

wherein the core region, the cladding layer, and the endcaps collectively form a monolithic fused structure;

wherein each of the endcaps has a major outer surface that is larger in area than a combined area of the faces of the core region and the cladding layer to which the endcap is attached; and wherein the PWG amplifier is configured to be placed into a coolant bath, where liquid seals are implemented using the endcaps.

\* \* \* \* \*